United States Patent
Jung et al.

(10) Patent No.: US 10,042,087 B2
(45) Date of Patent: Aug. 7, 2018

(54) PHOTOSENSITIVE RESIN COMPOSITION AND COLOR FILTER USING THE SAME

(71) Applicant: Samsung SDI Co., Ltd., Yongin-si (KR)

(72) Inventors: Ju-Ho Jung, Suwon-si (KR); Ji-Hye Kwon, Suwon-si (KR); Jee-Hyun Ryu, Suwon-si (KR); In-Jae Lee, Suwon-si (KR); Min-Kyeol Chung, Suwon-si (KR); Sang-Won Cho, Suwon-si (KR); Mi-Jin Choi, Suwon-si (KR); Seung-Jib Choi, Suwon-si (KR); Soo-Young Heo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 785 days.

(21) Appl. No.: 14/465,211

(22) Filed: Aug. 21, 2014

(65) Prior Publication Data

US 2015/0069310 A1 Mar. 12, 2015

(30) Foreign Application Priority Data

Sep. 6, 2013 (KR) .................. 10-2013-0107399

(51) Int. Cl.
*G02B 5/23* (2006.01)
*G02B 1/04* (2006.01)
*G02B 5/22* (2006.01)

(52) U.S. Cl.
CPC .............. *G02B 1/04* (2013.01); *G02B 5/223* (2013.01)

(58) Field of Classification Search
USPC ........................................................ 252/586
See application file for complete search history.

(56) References Cited

U.S. PATENT DOCUMENTS

2012/0138858 A1 6/2012 Lee et al.

FOREIGN PATENT DOCUMENTS

| CN | 102789129 A | | 11/2012 |
|---|---|---|---|
| JP | 2011-022237 A | | 2/2011 |
| JP | 2011022237 | * | 2/2011 |
| JP | 2012-093438 A | | 5/2012 |
| KR | 10-2009-0066242 A | | 6/2009 |
| KR | 10-2010-0026386 A | | 3/2010 |
| KR | 10-2010-0072934 A | | 7/2010 |
| KR | 1020100072934 | * | 7/2010 |
| KR | 10-2013-0021139 A | | 3/2013 |

OTHER PUBLICATIONS

Search Report in counterpart Taiwanese Application No. 103128723 dated Jun. 17, 2015, pp. 1.

* cited by examiner

*Primary Examiner* — Monique Peets
(74) *Attorney, Agent, or Firm* — Additon, Higgins & Pendleton, P.A.

(57) ABSTRACT

Disclosed are a photosensitive resin composition for a color filter including (A) a colorant including a dye; (B) a photocurable dispersing agent; (C) an acrylic-based binder resin; (D) a photopolymerizable monomer; (E) a photopolymerization initiator; and (F) a solvent, and a color filter using the same.

13 Claims, No Drawings

PHOTOSENSITIVE RESIN COMPOSITION AND COLOR FILTER USING THE SAME

CROSS-REFERENCE TO RELATED APPLICATION

This application claims priority to and the benefit of Korean Patent Application No. 10-2013-0107399 filed in the Korean Intellectual Property Office on Sep. 6, 2013, the entire disclosure of which is incorporated herein by reference.

FIELD OF THE INVENTION

This disclosure relates to a photosensitive resin composition for a color filter and a color filter using the same.

BACKGROUND

Recently, as the use of large screen liquid crystal displays (LCDs) has significantly increased, it has become increasingly required to improve performance of the same. There is active research on increasing the process margin of a color filter for productivity, since the color filter is the most important factor in realizing colors among the many parts of a liquid crystal display. In addition, in order to increase color purity of a large screen liquid crystal display (LCD), a color filter is manufactured using a photosensitive resin composition prepared by increasing concentration of a colorant. Accordingly, a photosensitive resin composition is required to have lowered development speed to increase productivity and yield in the manufacturing process and to have excellent sensitivity despite little exposure to light.

A photosensitive resin composition can be used to manufacture a color filter using various methods such as dyeing, electrophoretic deposition (EPD), printing, pigment dispersion, and the like, in which three or more colors are coated on a transparent substrate. Recently, the pigment dispersion method has been more actively adopted.

However, the pigment dispersion method has a problem of, for example, decreasing transmittance when a red pigment is increasingly included to form a red pixel displaying in a region with a high coloring property (a high concentration region) on a color coordinate. A yellow pigment can be used in a high concentration to make a color coordinate out of a yellow axis and to secure high transmittance. However, when a yellow pigment is increasingly used, there can be another problem of increasing the entire amount of pigment.

When a dye is used instead of the pigment, the dye can be polymerized or form a complex with a metal to improve reliability compared with a monomolecular dye. When the amount of the dye is increased or used alone, the reliability may still deteriorate. In addition, when the dye is used as a complex with a metal, color characteristics such as luminance and the like may deteriorate.

SUMMARY

One embodiment provides a photosensitive resin composition for a color filter that can have high luminance, excellent color characteristics and/or reliability.

Another embodiment provides a color filter manufactured using the photosensitive resin composition for a color filter.

One embodiment of the present invention provides a photosensitive resin composition for a color filter including (A) a colorant including a dye; (B) a photocurable dispersing agent; (C) an acrylic-based binder resin; (D) a photopolymerizable monomer; (E) a photopolymerization initiator; and (F) a solvent.

The photocurable dispersing agent may be an acrylate-based monomer, an ester-based monomer, an urethane-based monomer, an epoxy amide-based monomer, and/or a modified polymer of one or more of the foregoing monomers.

The photocurable dispersing agent may be represented by one or more selected from the following Chemical Formula 1 to Chemical Formula 4.

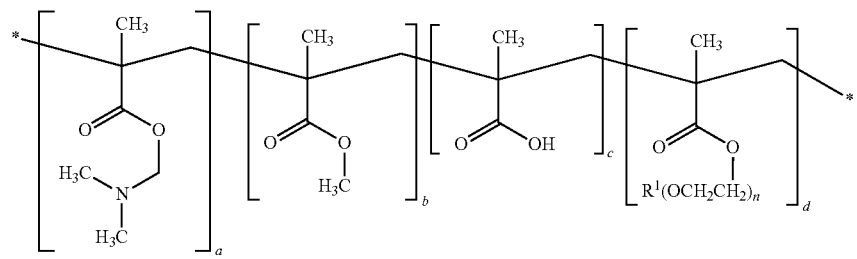

[Chemical Formula 1]

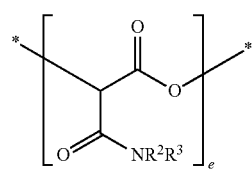

[Chemical Formula 2]

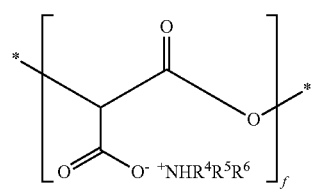

[Chemical Formula 3]

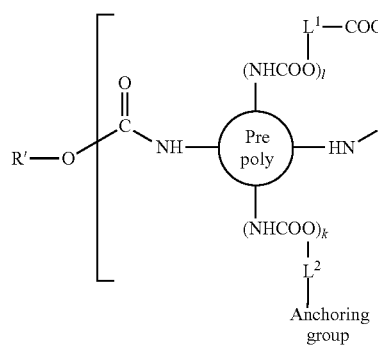
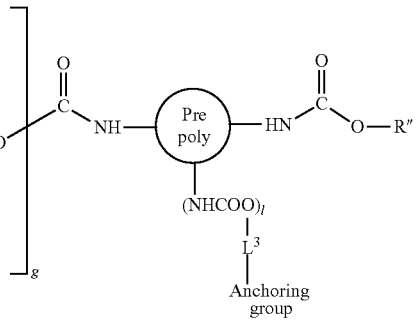

[Chemical Formula 4]

In the above Chemical Formula 1 to Chemical Formula 4, $R^1$ to $R^6$ are the same or different and are each independently hydrogen, C1 to C20 alkyl, C2 to C20 alkenyl, C2 to C20 alkynyl, C6 to C30 aryl, C3 to C20 cycloalkyl, C2 to C20 heterocycloalkyl, C3 to C30 heteroaryl, or a combination thereof, R' and R" are the same or different and are each independently C1 to C20 alkyl, $L^1$ to $L^3$ are the same or different and are each independently a single bond, C1 to C20 alkylene, C2 to C20 alkenylene, C2 to C20 alkynylene, C6 to C30 arylene, C3 to C20 cycloalkylene, C2 to C20 heterocycloalkylene, C3 to C30 heteroarylene, or a combination thereof, Pre poly is urethane prepolymer, Anchoring group is an acrylate group, -polyether- is represented by $-(L^4\text{-}O\text{-}L^5)_h\text{-}$, -polyester- is represented by $-(L^6\text{-}COO\text{-}L^7)_i\text{-}$, wherein $L^4$, $L^5$, $L^6$ and $L^7$ are the same or different and are each independently a single bond, C1 to C20 alkylene, C2 to C20 alkenylene group, a C2 to C20 alkynylene, C6 to C30 arylene, C3 to C20 cycloalkylene, C2 to C20 heterocycloalkylene, C3 to C30 heteroarylene, or a combination thereof, and a to l and n are the same or different and are each independently integers ranging from 1 to 20.

The dye may be a blue dye.

The colorant may further include a pigment.

The colorant may include the dye and the pigment in a weight ratio of about 5:5 to about 9.9:0.1.

The photosensitive resin composition for a color filter may include about 1 wt % to about 30 wt % of the colorant; about 0.1 wt % to about 20 wt % of the photocurable dispersing agent; about 1 wt % to about 30 wt % of the acrylic-based binder resin; about 1 wt % to about 15 wt % of the photopolymerizable monomer; about 0.1 wt % to about 10 wt % of the photopolymerization initiator; and a balance amount of the solvent.

The acrylic-based binder resin may include a polymer of a first ethylenic unsaturated monomer including (meth)acrylic acid, maleic acid, itaconic acid, fumaric acid, or a combination thereof; and a second ethylenic unsaturated monomer of styrene, α-methylstyrene, vinyltoluene, vinylbenzylmethylether, methyl(meth)acrylate, ethyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, 2-aminoethyl(meth)acrylate, 2-dimethylaminoethyl(meth)acrylate, vinyl acetate, vinyl benzoate, glycidyl(meth)acrylate, (meth)acrylonitrile, (meth)acrylamide, or a combination thereof.

The photopolymerizable monomer may include ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolac epoxy(meth)acrylate, or a combination thereof.

The photosensitive resin composition for a color filter may further include an additive of malonic acid; 3-amino-1,2-propanediol; a silane-based coupling agent having a vinyl group or a (meth)acryloxy group; a leveling agent; fluorine-based surfactant; radical polymerization initiator; or a combination thereof.

Another embodiment provides a color filter manufactured using the photosensitive resin composition for a color filter.

Other embodiments of the present invention are included in the following detailed description.

The photosensitive resin composition can have high luminance, excellent color characteristics and/or reliability, and thus may be used in a color filter.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" refers to one substituted with one or more substituents including halogen (F, Cl, Br, I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or a combination thereof, instead of at least one hydrogen.

As used herein, when a specific definition is not otherwise provided, the term "hetero" may refer to one substituted with at least one hetero atom including N, O, S and/or P, instead of at least one C in a cyclic substituent.

As used herein, when a specific definition is not otherwise provided, "(meth)acrylate" refers to both "acrylate" and "methacrylate", and "(meth)acrylic acid" refers to both "acrylic acid" and "methacrylic acid".

As used herein, when a specific definition is not otherwise provided, "*" indicates a point where the same or different atom or chemical formula is linked.

A photosensitive resin composition for a color filter according to one embodiment includes (A) a colorant including a dye; (B) a photocurable dispersing agent; (C) an acrylic-based binder resin; (D) a photopolymerizable monomer; (E) a photopolymerization initiator; and (F) a solvent. The colorant may further include a pigment, and a weight ratio of the dye and the pigment may be about 5:5 to about 9.9:0.1.

The photosensitive resin composition for a color filter includes the dye as a main colorant component but may show high reliability such as heat resistance, light resistance, chemical resistance and the like and maintain excellent color characteristics such as high luminance and the like. The reason is that the photocurable dispersing agent including an acrylate-based monomer, an ester-based monomer, a urethane-based monomer, an epoxy amide-based monomer, and/or a modified polymer of one or more of the foregoing monomers is used with the dye.

Hereinafter, each component is described in detail.

(A) Colorant

The colorant includes a dye as a main component.

The dye can have excellent dissolubility for a solvent and thus, no particle or a very small primary particle diameter ranging from about 1 nm to about 10 nm in a solution state unlike a pigment having a particle and accordingly, may have high durability. In this way, when the dye has a very smaller particle diameter than the pigment, light-scattering is decreased, and resultantly, a contrast ratio and luminance may be improved, which may complement a problem of decreasing the contrast ratio and luminance that a pigment dispersion method mainly used to manufacture a color filter has.

The dye having the characteristics may realize high luminance and a high contrast ratio in a desired color coordinate and thus, be usefully applied to a LCD color filter having CCFL or LED as a backlight.

Examples of the dye may include without limitation a direct dye, acidic dye, basic dye, acidic mordant dye, a sulfide dye, a reduction dye, an azoic dye, a disperse dye, a reactive dye, an oxidation dye, an alcohol soluble dye, an azo dye, an anthraquinone dye, an indigoid dye, a carbonium ion dye, a phthalocyanine dye, a nitro dye, a quinoline dye, a cyanine dye, a methine dye, a rhodamine dye, a rylene dye, an azo cyanine dye, and the like, and a combination thereof.

Examples of the dye may include without limitation C.I. acid violet 49, C.I. basic violet 1, C.I. basic violet 3, C.I. basic violet 4, C.I. basic violet 7, C.I. basic violet 10, C.I. basic violet 11, C.I. basic violet 14, C.I. basic violet 18, C.I. basic yellow 2, C.I. basic yellow 9, C.I. basic yellow 13, C.I. basic yellow 15, C.I. basic yellow 21, C.I. basic yellow 23, C.I. basic yellow 24, C.I. basic yellow 25, C.I. basic yellow 32, C.I. basic yellow 41, C.I. basic orange 2, C.I. basic orange 14, C.I. basic orange 22, C.I. basic orange 23, C.I. basic orange 24, C.I. basic orange 25, C.I. basic orange 30, C.I. basic orange 33, C.I. basic green 1, C.I. basic green 4, C.I. basic green 5, C.I. acid blue 7, C.I. basic blue 1, C.I. basic blue 3, C.I. basic blue 6, C.I. basic blue 9, C.I. basic blue 22, C.I. basic blue 41, C.I. basic blue 45, C.I. basic blue 47, C.I. basic blue 64, C.I. basic blue 66, C.I. mordant blue 1, C.I. basic red 1, C.I. basic red 2, C.I. basic red 9, C.I. basic red 11 (rhodamin S), C.I. basic red 14, C.I. basic red 17, C.I. basic red 18, C.I. basic red 22, C.I. basic red 23, C.I. basic red 24, C.I. basic red 25, C.I. basic red 27, C.I. basic red 29, C.I. basic red 30, C.I. basic red 39, C.I. acid red 52, C.I. basic brown 1, C.I. basic black 2, and the like, and combinations thereof.

In one embodiment, the dye may be a blue dye. When the photosensitive resin composition for a color filter includes the blue dye as a colorant, transmittance and a contrast ratio may be improved.

The photosensitive resin composition for a color filter may further include a red dye and/or a green dye in addition to or other than the blue dye.

According to one embodiment, the above dye may be used alone as a colorant or mixed with a pigment to improve durability.

Examples of the pigment may include without limitation red pigments, yellow pigments, and the like, and combinations thereof.

Examples of the red pigment may include without limitation compounds having at least one azo group, for example C.I. pigment red 254, C.I. pigment red 242, C.I. pigment red 214, C.I. pigment red 221, C.I. pigment red 166, C.I. pigment red 220, C.I. pigment red 248, C.I. pigment red 262, and the like in a color index, and these may be used singularly or as a mixture of two or more.

Examples of the yellow pigment may include without limitation C.I. pigment yellow 139, C.I. pigment yellow 138, C.I. pigment yellow 150, and the like, in a color index, and these may be used singularly or as a mixture of two or more.

The colorant may include the dye and the pigment in a weight ratio of about 5:5 to about 9.9:0.1, for example about 6:4 to about 7:3. Within the weight ratio range, a high contrast ratio may be obtained while color characteristics are maintained.

The photosensitive resin composition may include the colorant in an amount of about 1 to about 30 wt %, and for example about 3 to about 25 wt %, based on the total amount (total weight, 100 wt %) of the photosensitive resin composition for a color filter. In some embodiments, the photosensitive resin composition may include the colorant in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the colorant can be in a range from about any of the foregoing amounts to about any other of the foregoing amounts.

When the colorant is present in an amount within the above range, a high contrast ratio in the same color coordinate may be realized while excellent color characteristics can be obtained.

(B) Photocurable Dispersing Agent

Examples of the photocurable dispersing agent may include without limitation acrylate-based monomers, ester-based monomers, urethane-based monomers, epoxy amide-based monomers, modified polymers of one or more of the foregoing monomers, and the like, and combinations thereof. When a dye is used as a main component of a colorant, reliability may be deteriorated, but when the dye is used with the photocurable dispersing agent, reliability and sensitivity of a photosensitive composition for a color filter may be improved.

Examples of monomers for forming the photocurable dispersing agent may include without limitation (meth) acrylate-based monomers such as acrylic acid, methacrylic acid, methyl(meth)acrylate, ethyl(meth)acrylate, propyl (meth)acrylate, ethylhexyl(meth)acrylate, phenyl(meth) acrylate, acrylic acid benzyl(meth)acrylate, benzyl(meth) acrylate, tolyl(meth)acrylate, o-silyl(meth)acrylate, glycerol (meth)acrylate, alkylaryl(meth)acrylate, succinic(meth) acrylate, and the like; lactone-based monomers such as caprolactone, butyrolactone, and the like. These may be used singularly or as a mixture of two or more. In other words, a polymer of one, two, or more kinds of the monomers and/or a modified polymer with an appropriate functional group, may be used as the photocurable dispersing agent.

The photocurable dispersing agent may be represented by one or more selected from the following Chemical Formula 1 to Chemical Formula 4.

C20 cycloalkylene, C2 to C20 heterocycloalkylene, C3 to C30 heteroarylene, or a combination thereof, Pre poly is urethane prepolymer, Anchoring group is an acrylate group, -polyether- is represented by $-(L^4-O-L^5)_h-$, -polyester- is represented by $-(L^6-COO-L^7)_i-$, wherein $L^4$, $L^5$, $L^6$ and $L^7$ are the same or different and are each independently a single bond, C1 to C20 alkylene, C2 to C20 alkenylene, C2 to C20 alkynylene, C6 to C30 arylene, C3 to C20 cycloalkylene, C2 to C20 heterocycloalkylene, C3 to C30 heteroarylene, or a combination thereof, and a to l and n are the same or different and are each independently integers ranging from 1 to 20.

The photocurable dispersing agent represented by the above Chemical Formula 2 and/or 3 may be prepared by reacting cyclic ester, dihydric alcohol (alcohol having two hydroxy groups) and an amine compound.

The photosensitive resin composition may include the photocurable dispersing agent in an amount of about 0.1 to about 20 wt % based on the total weight of the photosen-

[Chemical Formula 1]

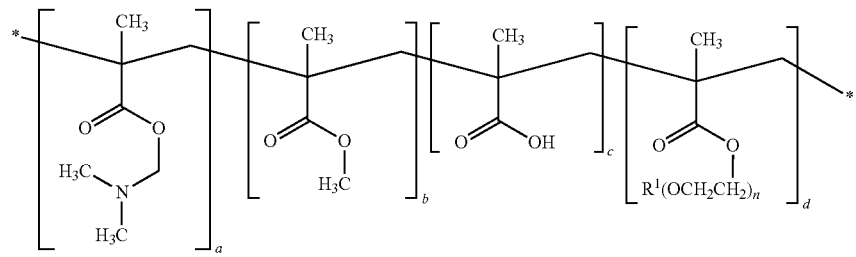

[Chemical Formula 2]

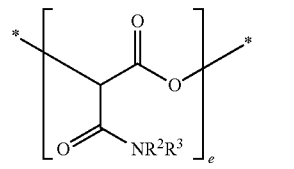

[Chemical Formula 3]

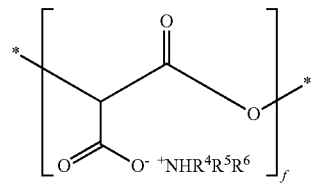

[Chemical Formula 4]

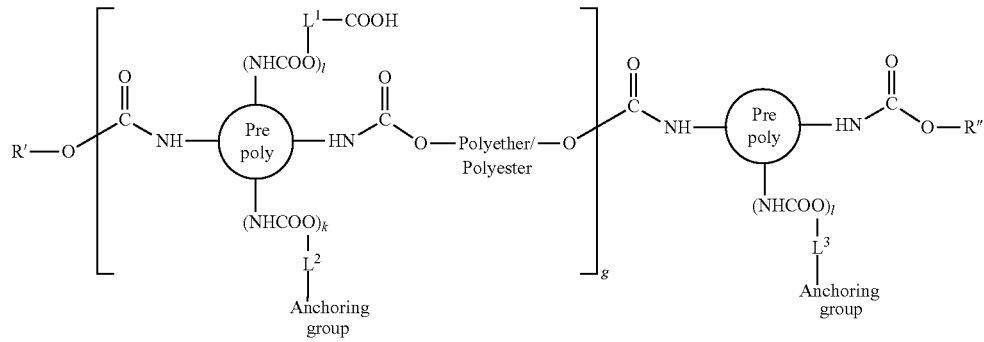

In the above Chemical Formula 1 to Chemical Formula 4, $R^1$ to $R^6$ are the same or different and are each independently hydrogen, C1 to C20 alkyl, C2 to C20 alkenyl, C2 to C20 alkynyl, C6 to C30 aryl, C3 to C20 cycloalkyl, C2 to C20 heterocycloalkyl, C3 to C30 heteroaryl, or a combination thereof, R' and R" are the same or different and are each independently C1 to C20 alkyl, $L^1$ to $L^3$ are the same or different and are each independently a single bond, C1 to C20 alkylene, C2 to C20 alkenylene, C2 to C20 alkynylene, C6 to C30 arylene, C3 to sitive resin composition for a color filter and in an amount of about 3 to about 8 wt % based on the total weight of the dye.

In some embodiments, the photosensitive resin composition may include the photocurable dispersing agent in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. Further, according to some embodiments of the present invention, the amount of the photocurable dispersing agent can be in a range from about any of the foregoing amounts to about any other of the foregoing amounts.

When the photocurable dispersing agent is used in an amount within the above range, optical, physical and chemical quality of a color filter may be improved.

(C) Acrylic-Based Binder Resin

The acrylic-based binder resin is a copolymer of a first ethylenic unsaturated monomer and a second ethylenic unsaturated monomer that is copolymerizable therewith, and is a resin including at least one acrylic-based repeating unit.

The first ethylenic unsaturated monomer is an ethylenic unsaturated monomer including at least one carboxyl group. Examples of the first ethylenic unsaturated monomer include without limitation acrylic acid, methacrylic acid, maleic acid, itaconic acid, fumaric acid, and the like, and combinations thereof.

The first ethylenic unsaturated monomer may be included in an amount of about 5 wt % to about 50 wt %, for example about 10 wt % to about 40 wt % based, on the total amount (total weight, 100 wt %) of the acrylic-based binder resin.

Examples of the second ethylenic unsaturated monomer may include without limitation aromatic vinyl compounds such as styrene, α-methylstyrene, vinyl toluene, vinylbenzylmethylether, and the like; unsaturated carboxylate ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid amino alkyl ester compounds such as 2-aminoethyl(meth)acrylate, 2-dimethylaminoethyl(meth)acrylate, and the like; carboxylic acid vinyl ester compounds such as vinyl acetate, vinyl benzoate and the like; unsaturated carboxylic acid glycidyl ester compounds such as glycidyl(meth)acrylate and the like; vinyl cyanide compounds such as (meth)acrylonitrile and the like; unsaturated amide compounds such as (meth)acrylamide and the like; and the like. These may be used singularly or as a mixture of two or more.

Examples of the acrylic-based binder resin may include without limitation a (meth)acrylic acid/benzylmethacrylate copolymer, a (meth)acrylic acid/benzylmethacrylate/styrene copolymer, a (meth)acrylic acid/benzylmethacrylate/2-hydroxyethyl methacrylate copolymer, a (meth)acrylic acid/benzylmethacrylate/styrene/2-hydroxyethyl methacrylate copolymer, and the like. These may be used singularly or as a mixture of two or more.

The acrylic-based binder resin may have a weight average molecular weight of about 3,000 g/mol to about 150,000 g/mol, for example about 5,000 g/mol to about 50,000 g/mol. When the acrylic-based binder resin has a weight average molecular weight within the above range, the photosensitive resin composition for a color filter may have excellent physical and chemical properties and an appropriate viscosity, maintain appropriate developability and sensitivity, and show excellent close-contacting (adhesive) properties to a substrate during manufacture of a color filter.

The acrylic-based binder resin may have an acid value of about 15 mgKOH/g to about 60 mgKOH/g, for example, about 20 mgKOH/g to about 50 mgKOH/g. When the acrylic-based binder resin has an acid value within the above range, a pixel may have excellent resolution.

The photosensitive resin composition may include the acrylic-based binder resin in an amount of about 1 wt % to about 30 wt %, for example about 5 wt % to about 20 wt %, based on the total amount (total weight, 100 wt %) of the photosensitive resin composition for a color filter. In some embodiments, the photosensitive resin composition may include the acrylic-based binder resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the acrylic-based binder resin can be in a range from about any of the foregoing amounts to about any other of the foregoing amounts.

When the acrylic-based binder resin is included in an amount within the above range, developability may be improved and excellent surface smoothness may be improved due to improved cross-linking during the manufacture of a color filter.

(D) Photopolymerizable Monomer

The photopolymerizable monomer may be a mono-functional and/or multi-functional ester of (meth)acrylic acid including at least one ethylenic unsaturated double bond.

The photopolymerizable monomer has the ethylenic unsaturated double bond and thus, may cause sufficient polymerization during exposure in a pattern-forming process and form a pattern having excellent heat resistance, light resistance, and chemical resistance.

Examples of the photopolymerizable monomer may include without limitation ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolac epoxy(meth)acrylate, and the like, and combinations thereof.

Commercially available examples of the reactive unsaturated compound include the following, without limitation. Examples of the mono-functional (meth)acrylic acid ester may include without limitation Aronix M-101®, M-111®, and/or M-114® (Toagosei Chemistry Industry Co., Ltd.); KAYARAD TC-110S® and/or TC-120S® (Nippon Kayaku Co., Ltd.); V-158® and/or V-2311® (Osaka Organic Chemical Ind., Ltd.), and the like. Examples of a difunctional (meth)acrylic acid ester may include without limitation Aronix M-210®, M-240®, and/or M-6200® (Toagosei Chemistry Industry Co., Ltd.), KAYARAD HDDA®, HX-220®, and/or R-604® (Nippon Kayaku Co., Ltd.), V-260®, V-312®, and/or V-335 HP® (Osaka Organic Chemical Ind., Ltd.), and the like. Examples of a tri-functional (meth)acrylic acid ester may include without limitation Aronix M-309®, M-400®, M-405®, M-450®, M-7100®, M-8030®, and/or M-8060® (Toagosei Chemistry Industry Co., Ltd.), KAYARAD TMPTA®, DPCA-20®, DPCA-30®, DPCA-60®, and/or DPCA-120® (Nippon Kayaku Co., Ltd.), V-295®, V-300®, V-360®, V-GPT®, V-3PA®, and/or V-400® (Osaka Yuki Kayaku Kogyo Co. Ltd.), and the like. These may be used singularly or as a mixture of two or more.

The photopolymerizable monomer may be treated with acid anhydride to improve developability.

The photosensitive resin composition may include the photopolymerizable monomer in an amount of about 1 wt % to about 15 wt %, for example about 5 wt % to about 10 wt %, based on the total amount (total weight, 100 wt %) of the photosensitive resin composition for a color filter. In some embodiments, the photosensitive resin composition may include the photopolymerizable monomer in an amount of about 1, 2, 3, 4, 5, 6, 7, 8, 9, 10, 11, 12, 13, 14, or 15 wt %. Further, according to some embodiments of the present invention, the amount of the photopolymerizable monomer can be in a range from about any of the foregoing amounts to about any other of the foregoing amounts.

When the photopolymerizable monomer is included in an amount within the above range, the photopolymerizable monomer can be sufficiently cured during exposure in a pattern-forming process and can have excellent reliability, and developability for alkali developing solution may be improved.

(E) Photopolymerization Initiator

Examples of the photopolymerization initiator may include without limitation acetophenone-based compounds, benzophenone-based compounds, thioxanthone-based compounds, benzoin-based compounds, triazine-based compounds, oxime-based compounds, and the like, and combinations thereof.

Examples of the acetophenone-based compound may include without limitation 2,2'-diethoxy acetophenone, 2,2'-dibutoxy acetophenone, 2-hydroxy-2-methylpropiophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like, and combinations thereof.

Examples of the benzophenone-based compound may include without limitation benzophenone, benzoyl benzoate, benzoyl benzoate methyl ester, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like, and combinations thereof.

Examples of the thioxanthone-based compound may include without limitation thioxanthone, 2-methylthioxanthone, isopropyl thioxanthone, 2,4-diethyl thioxanthone, 2,4-diisopropyl thioxanthone, 2-chlorothioxanthone, and the like, and combinations thereof.

Examples of the benzoin-based compound may include without limitation benzoin, benzoin methyl ether, benzoin ethyl ether, benzoin isopropyl ether, benzoin isobutyl ether, benzyldimethylketal, and the like, and combinations thereof.

Examples of the triazine-based compound may include without limitation 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl-4,6-bis(trichloro methyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like, and combinations thereof.

Examples of the oxime-based compound may include without limitation 2-(o-benzoyloxime)-1-[4-(phenylthio) phenyl]-1,2-octandione, 1-(o-acetyloxime)-1-[9-ethyl-6-(2-methylbenzoyl)-9H-carbazol-3-yl]ethanone, and the like, and combinations thereof.

The photopolymerization initiator may further include one or more of a carbazole-based compound, a diketone-based compound, a sulfonium borate-based compound, a diazo-based compound, an imidazole-based compound, a biimidazole-based compound, and the like in addition to or alternatively to the compounds above.

The photosensitive resin composition may include the photopolymerization initiator in an amount of about 0.1 wt % to about 10 wt %, for example about 0.5 wt % to about 5 wt %, based on the total amount (total weight, 100 wt %) of the photosensitive resin composition for a color filter. In some embodiments, the photosensitive resin composition may include the photopolymerization initiator in an amount of about 0.1, 0.2, 0.3, 0.4, 0.5, 0.6, 0.7, 0.8, 0.9, 1, 2, 3, 4, 5, 6, 7, 8, 9, or 10 wt %. Further, according to some embodiments of the present invention, the amount of the photopolymerization initiator can be in a range from about any of the foregoing amounts to about any other of the foregoing amounts.

When the photopolymerization initiator is included in an amount within the above range, sufficient photopolymerization can occur during exposure in a pattern-forming process, and transmittance may be prevented from deterioration due to a non-reaction initiator.

(F) Solvent

The solvent is a material having compatibility with the dye and pigment, the acryl-based binder resin, the photopolymerizable monomer, and the photopolymerization initiator but not reacting therewith.

Examples of the solvent may include without limitation alcohols such as methanol, ethanol and the like; ethers such as dichloroethyl ether, n-butyl ether, diisoamyl ether, methylphenyl ether, tetrahydrofuran, and the like; glycol ethers such ethylene glycol methylether, ethylene glycol ethylether, propylene glycol methylether and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, n-pentyl acetate, n-hexyl acetate, isobutyl acetate, and the like; alkyl lactate esters such as methyl lactate, ethyl lactate, and the like; hydroxyacetic acid alkyl esters such as methyl hydroxyacetate, ethyl hydroxyacetate, butyl hydroxyacetate, and the like; alkoxyalkyl acetate esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2- methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketonate esters such as ethyl pyruvate, and the like, and combinations thereof. Additionally, a solvent such as N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like, and combinations thereof may be also used. They may be used singularly or as a mixture of two or more.

Considering miscibility and reactivity, glycol ethers such as ethylene glycol monoethyl ether, and the like; ethylene glycol alkylether acetates such as ethyl cellosolve acetate, and the like; esters such as 2-hydroxyethyl propionate, and the like; diethylene glycols such as diethylene glycol monomethyl ether, and the like; propylene glycol alkylether acetates such as propylene glycol monomethylether acetate, propylene glycol propylether acetate and the like, and combinations thereof may be used.

The solvent is used in a balance amount, for example about 20 wt % to 90 wt % based on the total amount (total weight, 100 wt %) of the photosensitive resin composition for a color filter. In some embodiments, the photosensitive resin composition may include the solvent in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the solvent can be in a range from about any of the foregoing amounts to about any other of the foregoing amounts.

When the solvent is included in an amount within the above range, the photosensitive resin composition for a color filter can have a good coating property, and may maintain excellent flatness of a film having a thickness of about 3 µm or more.

(G) Other Additive(s)

The photosensitive resin composition for a color filter may further include one or more other additives such as but not limited to malonic acid; 3-amino-1,2-propanediol; a silane-based coupling agent including a vinyl group or a (meth)acryloxy group; a leveling agent; a fluorine-based surfactant; and/or a radical polymerization initiator, in order to prevent stains or spots during the coating, to adjust leveling, and/or to prevent pattern residue due to non-development.

Examples of the silane-based coupling agent may include without limitation trimethoxysilyl benzoic acid, γ-methacryl oxypropyl trimethoxysilane, vinyl triacetoxysilane, vinyl trimethoxysilane, γ-iso cyanate propyl triethoxysilane, γ-glycidoxy propyl trimethoxysilane, β-(3,4-epoxycyclohexyl)ethyltrimethoxysilane, and the like. These may be used singularly or in a mixture of two or more.

Examples of the fluorine-based surfactant may include without limitation commercial fluorine-based surfactants such as BM-1000® and/or BM-1100° (BM Chemie Inc.); MEGAFACE F 142D®, F 172®, F 173®, and/or F 183° (Dainippon Ink Kagaku Kogyo Co., Ltd.); FULORAD FC-135®, FULORAD FC-170C®, FULORAD FC-430®, and/or FULORAD FC-431® (Sumitomo 3M Co., Ltd.); SURFLON S-112®, SURFLON S-113®, SURFLON S-131®, SURFLON S-141®, and/or SURFLON S-145® (Asahi Glass Co., Ltd.); SH-28PA®, SH-190®, SH-193®, SZ-6032®, and/or SF-8428° (Toray Silicone Co., Ltd.), and the like, and combinations thereof.

An amount of the additive(s) used may be controlled depending on desired properties.

The photosensitive resin composition for a color filter may further include an epoxy compound in order to improve a close contacting (adhesive) property with a substrate.

Examples of the epoxy compound may include without limitation phenol novolac epoxy compounds, tetramethyl biphenyl epoxy compounds, bisphenol A epoxy compounds, alicyclic epoxy compounds, and the like, and combinations thereof.

The epoxy compound may be included in an amount of about 0.01 parts by weight to 5 parts by weight, for example about 0.1 parts by weight to 5 parts by weight, based on about 100 parts by weight of the photosensitive resin composition for a color filter. When the epoxy compound is included in an amount within the above range, a close contacting property, heat resistance and chemical resistance may be improved.

Another embodiment provides a color filter manufactured using the above photosensitive resin composition for a color filter.

An exemplary non-limiting method of manufacturing the color filter is as follows.

The above photosensitive resin composition can be coated to form an about 0.5 µm to about 10 µm-thick resin composition layer on a glass substrate in an appropriate method such as spin coating, roller coating, spray coating, and the like.

Subsequently, the substrate having the resin composition layer can be radiated by light to form a pattern required for a color filter. The radiation may be performed by using UV, an electron beam or an X-ray as a light source, and the UV may be radiated, for example, in a region of about 190 nm to about 450 nm and as another example, about 200 nm to about 400 nm. The radiation may be performed by further using a photoresist mask. After performing the radiation process in this way, the resin composition layer exposed to the light source can be treated with a developing solution. Herein, a non-exposure region in the resin composition layer can be dissolved and forms the pattern for a color filter. This process may be repeated as many times as the number of necessary colors, obtaining a color filter having a desired pattern. In addition, when the image pattern obtained through development in the above process is cured by reheating or radiating an actinic ray thereinto, crack resistance, solvent resistance, and the like may be improved.

Hereinafter, the present invention is illustrated in more detail with reference to the following examples. These examples, however, are not in any sense to be interpreted as limiting the scope of the invention.

(Preparation of Photosensitive Resin Composition for Color Filter)

Example 1

The amount of a photopolymerization initiator is precisely measured, and a solvent was added thereto, and the mixture is sufficiently agitated until the photopolymerization initiator is completely dissolved in the solvent (greater than or equal to 30 minutes). An acrylic-based binder resin, a photopolymerizable monomer and a photocurable dispersing agent are sequentially added thereto, and the resulting mixture is agitated again for about one hour. Other additives and a dye are subsequently added thereto, and the obtained mixture is finally agitated for greater than or equal to 2 hours, preparing a photosensitive resin composition.

The component specifications used to prepare the photosensitive resin composition are provided in the following Table 1. In the following Tables 1 to 5, a mark '' indicates the amount of the binder resin based on that of a solid, and another mark '*' indicates only the amount of the dye of a millbase.

TABLE 1

| Component | | Amount (g) |
| --- | --- | --- |
| Acrylic-based binder resin | 200H (SMS) | 10.00** |
| Photopolymerizable monomer | Dipentaerythritol hexa-acrylate (DPHA) | 10.00 |
| Photopolymerization initiator | OXE02 (Ciba-Geigy) | 1.00 |
| Photocurable dispersing agent | X300 (SOLSPERSE) | 0.24 |
| Solvent | propylene glycol methyletheracetate | 75.46 |
| Dye | BLUE 8B 45% (Kyeongin) | 3.00*** |
| Other additives | γ-glycidoxy propyl trimethoxysilane (S-710, Chisso) | 0.31 |

Example 2

A photosensitive resin composition is prepared according to the same method as photosensitive resin composition except for using Solsperse 32000 (SOLSPERSE) instead of X300 as the photocurable dispersing agent.

Example 3

A photosensitive resin composition is prepared according to the same method as Example 1 except for the composition of the following Table 2 instead of the composition of Table 1. The component specifications of the photosensitive resin composition are provided in the following Table 2.

TABLE 2

| Component | | Amount (g) |
| --- | --- | --- |
| Acrylic-based binder resin | 200H (SMS) | 10.00** |
| Photopolymerizable monomer | Dipentaerythritol hexa-acrylate (DPHA) | 10.00 |
| Photopolymerization initiator | OXE02 (Ciba-Geigy) | 1.00 |
| Photocurable dispersing agent | X300 (SOLSPERSE) | 0.24 |
| Solvent | propylene glycol methyletheracetate | 75.46 |
| Dye | BLUE 8B 45% (Kyeongin) | 1.500*** |
| Pigment | SF BLUE GC1246 (SANYO) | 1.500 |
| Other additive | γ-glycidoxy propyl trimethoxysilane (S-710, Chisso) | 0.31 |

Example 4

A photosensitive resin composition is prepared according to the same method as Example 1 except for using the composition of the following Table 3 instead of the composition of Table 1. The component specifications of the photosensitive resin composition are provided in the following Table 3.

TABLE 3

| Component | | Amount (g) |
| --- | --- | --- |
| Acrylic-based binder resin | 200H (SMS) | 9.76** |
| Photopolymerizable monomer | DiPentaerythritol Hexa Acrylate (DPHA) | 10.00 |
| Photopolymerization initiator | OXE02 (Ciba-Geigy) | 1.00 |
| Photocurable dispersing agent | X300 (SOLSPERSE) | 0.48 |
| Solvent | propylene glycol methyletheracetate | 75.46 |
| Dye | BLUE 8B 45% (Kyeongin) | 3.00*** |
| Other additives | γ-glycidoxy propyl trimethoxysilane (S-710, Chisso) | 0.31 |

Example 5

A photosensitive resin composition is prepared according to the same method as Example 1 except for using the composition of the following Table 4 instead of the composition of Table 1. The component specifications of the photosensitive resin composition are provided in the following Table 4.

TABLE 4

| Component | | Amount (g) |
| --- | --- | --- |
| Acrylic-based binder resin | 200H (SMS) | 9.52** |
| Photopolymerizable monomer | DiPentaerythritol Hexa Acrylate (DPHA) | 10.00 |
| Photopolymerization initiator | OXE02 (Ciba-Geigy) | 1.00 |
| Photocurable dispersing agent | X300 (SOLSPERSE) | 0.72 |
| Solvent | propylene glycol methyletheracetate | 75.46 |
| Dye | BLUE 8B 45% (Kyeongin) | 3.00*** |
| Other additives | γ-glycidoxy propyl trimethoxysilane (S-710, Chisso) | 0.31 |

Comparative Example 1

A photosensitive resin composition is prepared according to the same method as Example 1 except for using the photopolymerizable monomer in an amount of 10.24 g instead of 10 g and no photocurable dispersing agent.

Comparative Example 2

A photosensitive resin composition is prepared according to the same method as Example 1 except for using the composition of the following Table 5 instead of the composition of Table 1. The component specifications of the photosensitive resin composition are provided in the following Table 5.

TABLE 5

| Component | | Amount (g) |
| --- | --- | --- |
| Acrylic-based binder resin | 200H (SMS) | 10.00** |
| Photopolymerizable monomer | Dipentaerythritol hexa-acrylate (DPHA) | 10.00 |
| Photopolymerization initiator | OXE02 (Ciba-Geigy) | 1.00 |

TABLE 5-continued

| Component | | Amount (g) |
|---|---|---|
| Photocurable dispersing agent | X300 (SOLSPERSE) | 0.24 |
| Solvent | Propylene glycol methyletheracetate | 75.46 |
| Pigment | TS112 (TOYO) | 3.000 |
| Other additives | γ-glycidoxy propyl trimethoxysilane (S-710, Chisso) | 0.31 |

Evaluation: Color Characteristics and Heat Resistance

The photosensitive resin compositions according to Examples and Comparative Examples are used to measure a color coordinate ($\Delta x$ and $\Delta y$), luminance ($\Delta Y$) and color variation ratio ($\Delta Eab^*$) in the following method, and the results are provided in the following Tables 6 to 8. The color coordinate and luminance are measured by using a spectrophotometer (Otsuka Inc., MCDPD), and each measuring method is as follows.

1. A substrate after post-baking is treated for chemical resistance by using an etchant, MCDPD (Otsuka Inc.) is used to measure a color before and after the treatment, the measurements are used as a reference to calculate $\Delta Eab^*$, and the results are provided in the following Table 6.

2. A substrate after post-baking is treated for chemical resistance by using a stripper, MCDPD (Otsuka Inc.) is used to measure a color before and after the treatment, the measurements are used as a reference to calculate $\Delta Eab^*$, and the results are provided in the following Table 7.

3. A substrate after post-baking is baked in a convection oven at 230° C./20 minutes, MCDPD (Otsuka Inc.) is used to measure a color before and after the baking, the measurements are used as a reference to calculate $\Delta Eab^*$, and the results are provided in the following Table 8.

TABLE 6

ETCHANT

| SAMPLE | $\Delta x$ | $\Delta y$ | $\Delta Y$ | $\Delta Eab^*$ |
|---|---|---|---|---|
| Example 1 | 0.000 | 0.001 | 0.119 | 0.47 |
| Example 2 | 0.000 | 0.001 | 0.148 | 0.52 |
| Example 3 | 0.000 | 0.001 | 0.133 | 0.62 |
| Example 4 | 0.000 | 0.001 | 0.145 | 0.63 |
| Example 5 | 0.000 | 0.001 | 0.179 | 0.74 |
| Comparative Example 1 | 0.066 | 0.087 | 19.200 | 39.69 |
| Comparative Example 2 | 0.000 | 0.001 | 0.148 | 0.52 |

TABLE 7

STRIPER

| SAMPLE | $\Delta x$ | $\Delta y$ | $\Delta Y$ | $\Delta Eab^*$ |
|---|---|---|---|---|
| Example 1 | 0.000 | 0.000 | 0.081 | 0.33 |
| Example 2 | 0.000 | 0.000 | 0.086 | 0.43 |
| Example 3 | 0.000 | 0.001 | 0.209 | 0.43 |
| Example 4 | 0.000 | 0.000 | 0.109 | 0.25 |
| Example 5 | 0.000 | 0.000 | 0.181 | 0.37 |
| Comparative Example 1 | 0.000 | 0.003 | 0.080 | 2.64 |
| Comparative Example 2 | 0.000 | 0.001 | 0.119 | 0.47 |

TABLE 8

Heat resistance

| SAMPLE | $\Delta x$ | $\Delta y$ | $\Delta Y$ | $\Delta Eab^*$ |
|---|---|---|---|---|
| Example 1 | 0.000 | 0.002 | −0.036 | 2.05 |
| Example 2 | 0.000 | 0.002 | −0.053 | 2.31 |
| Example 3 | 0.000 | 0.003 | 0.038 | 2.44 |
| Example 4 | 0.000 | 0.002 | −0.050 | 2.34 |
| Example 5 | 0.000 | 0.003 | 0.127 | 2.81 |
| Comparative Example 1 | 0.067 | 0.087 | 21.200 | 42.58 |
| Comparative Example 2 | 0.000 | 0.000 | 0.035 | 0.33 |

Referring to Tables 6 to 8, the photosensitive resin compositions including a photocurable dispersing agent according to Examples 1 to 5 exhibit excellent luminance, color characteristics and heat resistance compared with the photosensitive resin composition including no photocurable dispersing agent according to Comparative Example 1 and the photosensitive resin composition including no dye according to Comparative Example 2.

The high luminance and excellent color characteristics are caused by high color representation capability of the dye, and the excellent heat resistance is caused by reliability improvement of the photocurable dispersing agent.

In addition, since the dye is soluble in an organic solvent unlike a pigment having dispersed particles and thus, had no particle or a very smaller primary particle diameter than that of the pigment in the photosensitive resin composition and thus, decreased unnecessary light scattering, the photosensitive resin compositions including the dye according to Examples 1 to 5 exhibit a higher high contrast ratio than the photosensitive resin composition including no dye according to Comparative Example 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A photosensitive resin composition for a color filter, comprising:

(A) a colorant including a dye;

(B) a photocurable dispersing agent in an amount of about 3 wt % to about 8 wt % based on the total weight of the dye;

(C) an acrylic-based binder resin;

(D) a photopolymerizable monomer;

(E) a photopolymerization initiator; and (F) a solvent wherein the photocurable dispersing agent is represented by one or more of the following Chemical Formula 1 to Chemical Formula 4:

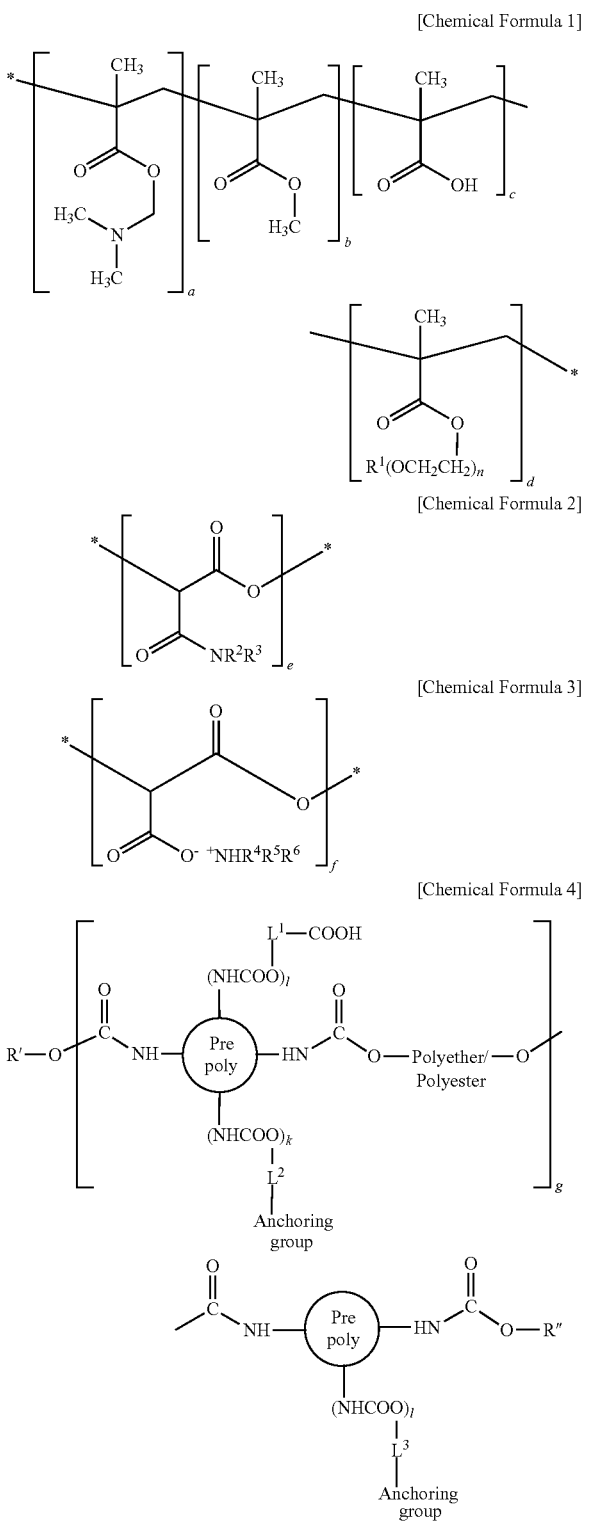

[Chemical Formula 1]

[Chemical Formula 2]

[Chemical Formula 3]

[Chemical Formula 4]

wherein, in the above Chemical Formula 1 to Chemical Formula 4, $R^1$ to $R^6$ are the same or different and are each independently hydrogen, $C_1$ to $C_{20}$ alkyl, $C_2$ to $C_{20}$ alkenyl, $C_2$ to $C_{20}$ alkynyl, $C_6$ to $C_{30}$ aryl, $C_3$ to $C_{20}$ cycloalkyl, $C_2$ to $C_{20}$ heterocycloalkyl, $C_3$ to $C_{30}$ heteroaryl group, or combination thereof, R' and R" are the same or different and are each independently $C_1$ to $C_{20}$ alkyl, $L^1$ to $L^3$ are the same or different and are each independently a single bond, $C_1$ to $C_{20}$ alkylene, $C_2$ to $C_{20}$ alkenylene, $C_2$ to $C_{20}$ alkynylene, $C_6$ to $C_{30}$ arylene, $C_3$ to $C_{20}$ cycloalkylene, $C_2$ to $C_{20}$ heterocycloalkylene, $C_3$ to $C_{30}$ heteroarylene, or a combination thereof, Pre poly is urethane prepolymer, Anchoring group is an acrylate group, polyether- is represented by $-(L^4\text{-O-}L^5)_h\text{-}$, -polyester- is represented by $-(L^6\text{-COO-}L^7)_i\text{-}$, wherein $L^4$, $L^5$, $L^6$ and $L^7$ are the same or different and are each independently a single bond, $C_1$ to $C_{20}$ alkylene, $C_2$ to $C_{20}$ alkenylene, $C_2$ to $C_{20}$ alkynylene, $C_6$ to $C_{30}$ arylene, $C_3$ to $C_{20}$ cycloalkylene, $C_2$ to $C_{20}$ heterocycloalkylene, $C_3$ to $C_{30}$ heteroarylene, or a combination thereof, and a to l and n are the same or different and are each independently integers ranging from 1 to 20.

2. The photosensitive resin composition for a color filter of claim 1, wherein the photocurable dispersing agent is an acrylate-based monomer, an ester-based monomer, an urethane-based monomer, an epoxy amide-based monomer, or a modified polymer of one or more of said monomers.

3. The photosensitive resin composition for a color filter of claim 1, wherein the dye is a blue dye.

4. The photosensitive resin composition for a color filter of claim 1, wherein the colorant further comprises a pigment.

5. The photosensitive resin composition for a color filter of claim 4, wherein the colorant comprises the dye and the pigment in a weight ratio of about 5:5 to about 9.9:0.1.

6. The photosensitive resin composition for a color filter of claim 1, wherein the photosensitive resin composition comprises:
about 1 wt % to about 30 wt % of the colorant;
about 0.1 wt % to about 20 wt % of the photocurable dispersing agent;
about 1 wt % to about 30 wt % of the acrylic-based binder resin;
about 1 wt % to about 15 wt % of the photopolymerizable monomer;
about 0.1 wt % to about 10 wt % of the photopolymerization initiator; and
a balance amount of the solvent.

7. The photosensitive resin composition for a color filter of claim 1, wherein the acrylic-based binder resin comprises a polymer of a first ethylenic unsaturated monomer including (meth)acrylic acid, maleic acid, itaconic acid, fumaric acid, or a combination thereof; and a second ethylenic unsaturated monomer of styrene, a-methylstyrene, vinyltoluene, vinylbenzylmethylether, methyl(meth)acrylate, ethyl(meth)acrylate, 2-hydroxyethyl(meth)acrylate, 2-hydroxy butyl(meth)acrylate, benzyl(meth)acrylate, cyclohexyl (meth)acrylate, phenyl(meth)acrylate, 2-aminoethyl(meth) acrylate, 2-dimethylaminoethyl(meth)acrylate, vinyl acetate, vinyl benzoate, glycidyl(meth)acrylate, (meth)acrylonitrile, (meth)acrylamide, or a combination thereof.

8. The photosensitive resin composition for a color filter of claim 1, wherein the photopolymerizable monomer comprises ethylene glycol di(meth)acrylate, diethylene glycol di(meth)acrylate, triethylene glycol di(meth)acrylate, propylene glycol di(meth)acrylate, neopentyl glycol di(meth) acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth) acrylate, dipentaerythritol di(meth)acrylate, dipentaerythritol tri(meth)acrylate, dipentaerythritol penta (meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolacepoxy (meth) acrylate, or a combination thereof.

9. The photosensitive resin composition for a color filter of claim 1, wherein the photosensitive resin composition further comprises malonic acid; 3-amino-1,2-propanediol; a silane-based coupling agent having a vinyl group or a (meth)acryloxy group; a leveling agent; a fluorine-based surfactant; a radical polymerization initiator; or a combination thereof.

10. A color filter manufactured using the photosensitive resin composition for a color filter of claim 1.

11. The photosensitive resin composition for a color filter of claim 1, wherein the colorant consists of a dye.

12. The photosensitive resin composition for a color filter of claim 1, wherein the acrylic-based binder resin is a polymer of a first ethylenic unsaturated monomer selected from the group consisting (meth)acrylic acid, maleic acid, itaconic acid, fumaric acid, and mixtures thereof and a second ethylenic unsaturated monomer selected from the group consisting of styrene, a-methyl styrene, vinyl toluene, vinyl benzyl methylether, methyl(meth)acrylate, ethyl (meth)acrylate, 2-hydroxyethyl(meth)acrylate, 2-hydroxy butyl(meth)acrylate, benzyl(meth)acrylate, cyclohexyl (meth)acrylate, phenyl(meth)acrylate, 2-aminoethyl(meth) acrylate, 2-dimethylaminoethyl(meth)acrylate, vinyl acetate, vinyl benzoate, glycidyl(meth)acrylate, (meth)acrylonitrile, (meth)acrylamide, and mixtures thereof.

13. The photosensitive resin composition for a color filter of claim 1, wherein the acrylic-based binder resin is a polymer selected from the group consisting of (meth)acrylic acid/benzyl methacrylate copolymer, (meth)acrylic acid/ benzyl methacrylate/styrene copolymer, (meth)acrylic acid/ benzyl methacrylate/2-hydroxyethylmethacrylate copolymer, (meth)acrylic acid/benzyl methacrylate/styrene/2-hydroxyethylmethacrylate copolymer, and mixtures thereof.

* * * * *